Feb. 28, 1928.

Re. 16,891

J. GRANT

RELEASABLE SPIDER

Original Filed Jan. 20, 1925

Inventor
John Grant

Attorney.

Reissued Feb. 28, 1928. Re. 16,891

UNITED STATES PATENT OFFICE.

JOHN GRANT, OF LOS ANGELES, CALIFORNIA.

RELEASABLE SPIDER.

Original No. 1,580,099, dated April 6, 1926, Serial No. 3,680, filed January 20, 1925. Application for reissue filed November 15, 1926. Serial No. 148,581.

This invention relates to a device for supporting casing, pipe, tubing, or like cylindrical work, and is especially adaptable for use in oil well work wherein it is desired to suspend the work from the surface. The present invention appertains to that type of suspension device known as a spider, wherein a collar is provided with a bore in which are disposed wedge slips arranged to grip and hold the work to be suspended.

It is the practice in oil well work to support the work by spiders, and, when it is desired to lower the work, to raise the latter to relieve the wedging action of the slips to permit withdrawal of the latter. After withdrawal of the slips, the work may be lowered through the collar of the spider and the slips reinserted to again grip and hold the work. The lift of a string of casing, pipe, or tubing which is commonly several thousand feet in length and is immersed in a slush in the hole requires a force of great magnitude thereby producing a resultant strain which often causes damage to the derrick, the supporting tools, or the work itself.

It is the primary object of this invention to provide a spider having slips which are releasable without requiring lifting of the work. There are certain other details of construction whereby a durable, strong, simple, and economical structure is obtained, one which is easily manipulated and may be used for a variety of work. These objects together with other objects and corresponding accomplishments are obtained by means of the embodiment of my invention illustrated in the accompanying drawing, in which.

Figure 1:
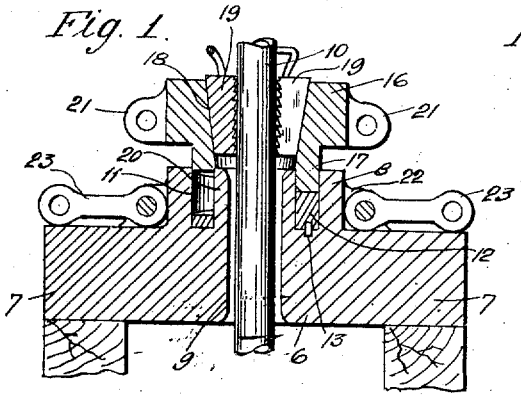
Fig. 1 is a vertical section through a spider with the collar and slips in position holding the work.
Figure 4:
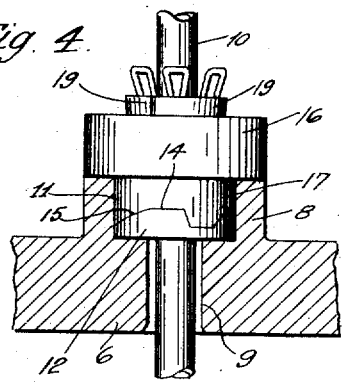
Fig. 4 is a vertical section through a fragment of the spider body showing the lifting ring and collar in elevation and in released position.

Referring more particularly to the drawing, 6 indicates a body having laterally extending arms 7 to engage and rest upon a supporting surface so as to span a well hole. Upstanding from the body is an annular rim 8. A bore 9 is formed in the body to provide for the passage of the work 10 therethrough. Formed in the body concentric with the bore 9 is an annular recess 11, and disposed in the bottom of the recess is a lifting ring 12, which may be conveniently held against turning by a key 13. The ring 12 has its upper face indented to form teeth 14 having sloping edges 15 of lesser inclination than the opposite edges.

Arranged to be disposed in the annular recess and resting upon the ring 12 is a collar 16 having an annular projection 17 with a lower face corresponding in contour to the upper face of ring 12. The collar is formed with a tapered bore to receive removable wedge slips 19 provided with the usual serrated faces. It will be noted that there is an abutment ring 20 formed on the body immediately below the slips.

The collar 16 has, on diametrically opposite sides, pairs of spaced lugs 21 formed with registering openings to receive pins or bolts. On the body are corresponding lugs 22 in which are pivotally mounted links 23. The links have eyes adapted to be disposed in registration with the eyes in lugs 21, when the collar is in its upper or holding position. Secured to the body is a spring leaf 24 arranged to be disposed in a recess 25 in the roller 16. Pivotally secured to the leaf is a release lever 26 having a cam end 27 arranged so that when the lever is swung into horizontal position, the cam end 27 will be in engagement with the body and hold the leaf spring away from the latter and out of the recess 25 in collar 16.

Figure 2:
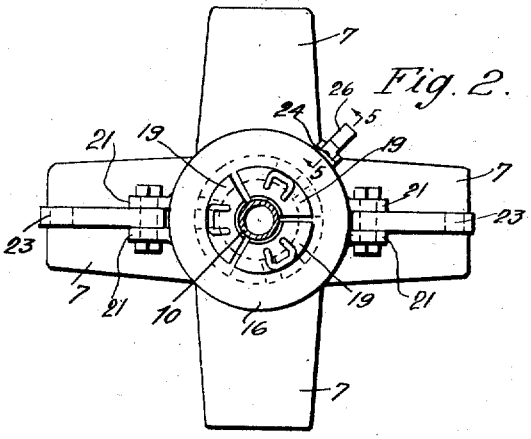
Fig. 2 is a plan view of the structure shown in Fig. 1.
Figure 5:
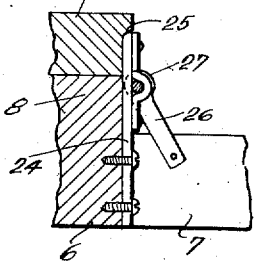
Fig. 5 is a fragmentary view on an enlarged scale of a section as seen on the line 5—5 of Fig. 2.

Suppose it is desired to hold the work 10 in the hole, the body of the spider is placed in position over the hole with its collar raised to the position shown in Figs. 1 and 2, the slips being removed, and the work 10 inserted through the bore. When the work is in the proper position for supporting it, the slips 19 are dropped into position and the weight of the pipe released from the supporting apparatus so that the slips are wedged into position and hold the work. In the position shown in Figs. 1 and 2, the spring catch 24 should be in position shown in Fig. 5 thereby holding the collar 16 against turning, the ends of the teeth on the extension 17 resting upon the top of the teeth on ring 12. Suppose it is now desired to release the work from support by the body, its collar 16 is grasped in any suitable manner, latch 24 released, by raising handle 26 and the collar turned so that the teeth on projection 11 and the ring 12 mesh, the collar moving downwardly. If the axial movement is equal to the stretch of the pipe or tubing, the slips will immediately release. However, upon further downward movement of the collar, the slips 19 engage abutment ring 20 thereby forcing the slips upwardly and releasing them from their wedged action against the work 10. This frees the work. If it is desired to use the device without employing the slip release means, its collar is placed in its upper position as shown in Figs. 1 and 2 and links 23 are raised and locked to lugs 21 by inserting bolts through the registering openings.

Figure 3:
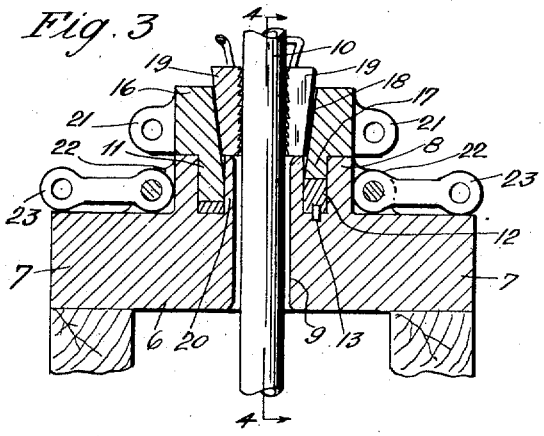
Fig. 3 is a vertical sectional view showing the collar and slips in released position.

From a consideration of the foregoing description it will be seen that the operation of releasing the slips from supporting engagement with the pipe is one that involves the transfer of the weight thrust from the collar 16 to the slips 19. With the parts in the position shown in Fig. 1 the slips are in operative engagement with both the pipe and the collar, and the weight thrust of the pipe is supported through the collar. When the collar is lowered towards the position shown in Fig. 3, the slips come into contact with abutment 20 and momenatrily the weight thrust of the pipe is transferred to the slips alone, the weight thrust being then taken solely through the slips to the abutment 20. When the weight thrust is thus taken off collar 16, there is no longer any wedging action of the slips in the collar, and the slips therefore release the pipe.

The distance through which it may be desired in practice to lower the collar 16 before the downward movement of the slips is stopped—before the weight thrust is transferred to the slips—is a matter depending merely on the fact that in the position of Fig. 1 the slips should be far enough above their limiting abutment 20 to be sure that they do not contact with the abutment before they wedge down in collar 16 far enough to grip the pipe properly. In practice this clearance between the slips and abutment 20 must be large enough to take care of commercial variations in a diameter of well pipe; if the well pipe were of an accurately uniform diameter the slips could, in the position of Fig. 1, rest or almost rest on the limiting abutment 20.

Considering all these matters it will be seen that the function of abutment 20 is to take the weight thrust of the pipe on or through the slips alone when collar 16 is lowered, transferring that weight thrust from the collar to the slips; and the abutment 20 does this by limiting the downward motion of the slips with the collar, or with reference to the body relative to which the collar is movable vertically.

I claim:

1. A device of the character described comprising the combination of a supporting body, a collar supported by said body so as to be raised or lowered at will with reference to the body, wedge slips disposed in said collar for holding the work upon being forced downwardly in said collar, and a normally stationary abutment on said body arranged to engage said slips upon lowering of said collar whereby to move said slips upwardly with respect to said collar and thereby release the work.

2. A device of the character described comprising the combination of a supporting body, a collar supported by said body, means to raise or lower said collar at will with reference to the body, wedge slips disposed in said collar for holding the work upon being forced downwardly in said collar, and a normally stationary abutment on said body arranged to engage said slips upon lowering said collar whereby to move said slips upwardly with respect to said collar and thereby release the work.

3. A device of the character described comprising the combination of a supporting body having a bore through which the work may be passed, a collar supported by said body so as to be raised and lowered at will with reference to the body, wedge slips disposed in said collar for gripping the work upon being forced downwardly in said collar, and normally stationary abutment means on said body arranged to engage said slips upon lowering of said collar whereby to move said slips upwardly with respect to said collar and thereby release the work.

4. A device of the character described comprising the combination of a supporting body having a bore through which the work may be passed, a collar supported by said body, means to raise or lower said collar at will with reference to the body, wedge slips disposed in said collar for gripping the work upon being forced downwardly in said collar, and normally stationary abutment means on said body arranged to engage said slips upon lowering of said collar whereby to move said slips upwardly with respect to said collar and thereby release the work.

5. A device of the character described comprising the combination of a supporting body, a collar supported by said body so as to be raised or lowered, means interposed between said body and collar for raising and lowering said collar on said body, wedge slips disposed in said collar for gripping the work upon being forced downwardly in said collar, and normally stationary abutment means on said body arranged to engage said slips upon lowering of said collar, whereby to move said slips upwardly with respect to said collar to thereby release the work.

6. A device of the character described comprising the combination of a supporting body, a collar supported by said body so as to be raised or lowered, a lifting ring interposed between said body and said collar, said collar and said ring having corresponding indentations for raising and lowering said collar on said body, wedge slips disposed in said collar for gripping the work upon being forced downwardly in said collar, and an abutment on said body arranged to engage said slips upon lowering of said collar whereby to move said slips upwardly with respect to said collar and thereby release the work.

7. A device of the character described comprising the combination of a supporting body, a collar supported by said body so as to permit rotation and axial movement thereof, means interposed between said body and said collar whereby rotation of said collar will raise or lower the latter on said body, wedge slips disposed in said collar for gripping the work upon being forced downwardly in said collar, and abutment means on said body arranged to engage said slips upon lowering of said collar whereby to move said slips upwardly with respect to said collar and thereby release the work.

8. A device of the character described comprising the combination of a supporting body, a collar supported by said body so as to permit rotation and axial movement with reference to the body, a lifting ring interposed between said body and said collar, said collar and said ring having corresponding teeth with sloping sides whereby rotation of said collar will raise or lower the latter with reference to the body, wedge slips disposed in said collar for gripping the work upon being forced downwardly in said collar, and abutment means on said body arranged to engage said slips upon lowering of said collar whereby to move said slips upwardly with respect to said collar and thereby release the work.

9. A device of the character described comprising the combination of a supporting body, a collar supported by said body so as to be raised and lowered, a lifting ring interposed between said body and said collar for raising and lowering said collar on said body, wedge slips disposed in said collar for gripping the work upon being forced downwardly in said collar, and an annular abutment on said body registering with said slips and arranged to engage the latter upon lowering of said collar thereby to move said slips upwardly with respect to said collar and thereby release the work.

10. A device of the character described comprising the combination of a supporting body, and a collar supported by said body so as to be raised or lowered with reference thereto, a lifting ring interposed between said body and said collar, said collar and said ring having corresponding teeth for raising and lowering said collar, wedge slips disposed in said collar for gripping the work upon being forced downwardly in said collar, and an annular abutment on said body registering with said slips arranged to engage the latter upon lowering of said collar whereby to move said slips upwardly with respect to said collar and thereby release the work.

11. A device of the character described comprising the combination of a supporting body, a collar supported by said body so as to permit rotation and axial movement with reference to the body, a lifting ring interposed between said body and said collar, said collar and said ring having corresponding teeth with sloping sides whereby rotation of said collar will raise or lower the latter with reference to the body, wedge slips disposed in said collar for gripping the work upon being forced downwardly in said collar and an annular abutment on said body registering with said slips and arranged to engage the latter upon lowering of said collar whereby to move said slips upwardly with respect to said collar and thereby release the work.

12. A device of the character described comprising the combination of a supporting body, a collar supported by said body so as to be raised or lowered thereon, a lifting ring interposed between said body and said collar, said collar and said ring having corresponding indentations for raising and lowering said collar on said body, and wedge slips disposed in said collar for gripping the work upon being forced downwardly in said collar.

13. A device of the character described comprising the combination of a supporting body, a collar supported by said body so as to permit rotation and axial movement thereof, means interposed between said body and said collar whereby rotation of said collar will raise or lower the latter on said body, and wedge slips disposed in said collar for gripping the work upon being forced downwardly in said collar.

14. A device of the character described comprising the combination of a supporting body, a collar supported by said body so as to permit rotation and axial movement with reference to the body, a lifting ring interposed between said body and said collar, said collar and said ring having corresponding teeth with sloping sides whereby rotation of said collar will raise or lower the latter with reference to the body, and wedge slips disposed in said collar for gripping the work upon being forced downwardly in said collar.

15. A device of the character described comprising the combination of a supporting body, a collar through which the work may be passed, said collar being supported in said body for axial movement therein, wedge slips mounted in said collar, and abutment means independent of the collar disposed below said slips so as to be engaged thereby by virtue of lowering caid collar in said body and to move the slips so as to release their hold upon the work.

16. A device of the character described comprising the combination of a supporting body, work supporting means including wedge slips mounted in said body, said means being movable upwardly and downwardly with reference to said body at will, and stationary abutment means independent of the work supporting means disposed to be engaged by said slips by virtue of lowering said means with reference to said body.

17. A device of the character described comprising the combination of a supporting body, means including wedge slips mounted in said body, said means being movable upwardly and downwardly with reference to said body at will, and means independent of said last mentioned means to limit the downward movement of the wedge slips with reference to the body.

18. A device of the character described comprising the combination of a supporting body, a collar through which the work may be passed, said collar being supported upon the body for vertical movement with reference thereto, wedge slips wedging downwardly in the collar to engage the work, and means stationary with the body and independent of the collar to limit downward movement of the wedge slips with the collar and with reference to the body.

19. A device of the character described comprising the combination of a supporting body, a supporting collar supported by the body so as to be rotatable and axially movable with relation thereto, means whereby rotation of said collar causes axial movement thereof with reference to the body, work engaging wedge slips in the collar, and means for limiting downward axial movement of the wedge slips relative to the body.

20. A device of the character described, comprising the combination of a supporting collar, wedge slips operatively engaging the collar to wedge down therein and engage work surrounded by the slips, means for supporting the collar for vertical movement, and slip supporting means independent of the collar to limit downward movement of the wedge slips when the collar is lowered.

21. A device of the character described comprising the combination of a supporting collar, wedge slips operatively engaging the collar to wedge down therein and engage work surrounded by the slips, the slips being normally carried by the collar and vertically movable therewith, means for supporting the collar for vertical movement and for normally taking the weight thrust of the work through slips, and slip supporting means independent of the collar and adapted to support the slips independently when the collar is lowered.

In witness that I claim the foregoing I have hereunto subscribed my name this 2 day of November, 1926.

JOHN GRANT.